March 3, 1970     D. S. LEE     3,498,553
WIRE TENSIONING DEVICE
Filed March 15, 1968     3 Sheets-Sheet 1
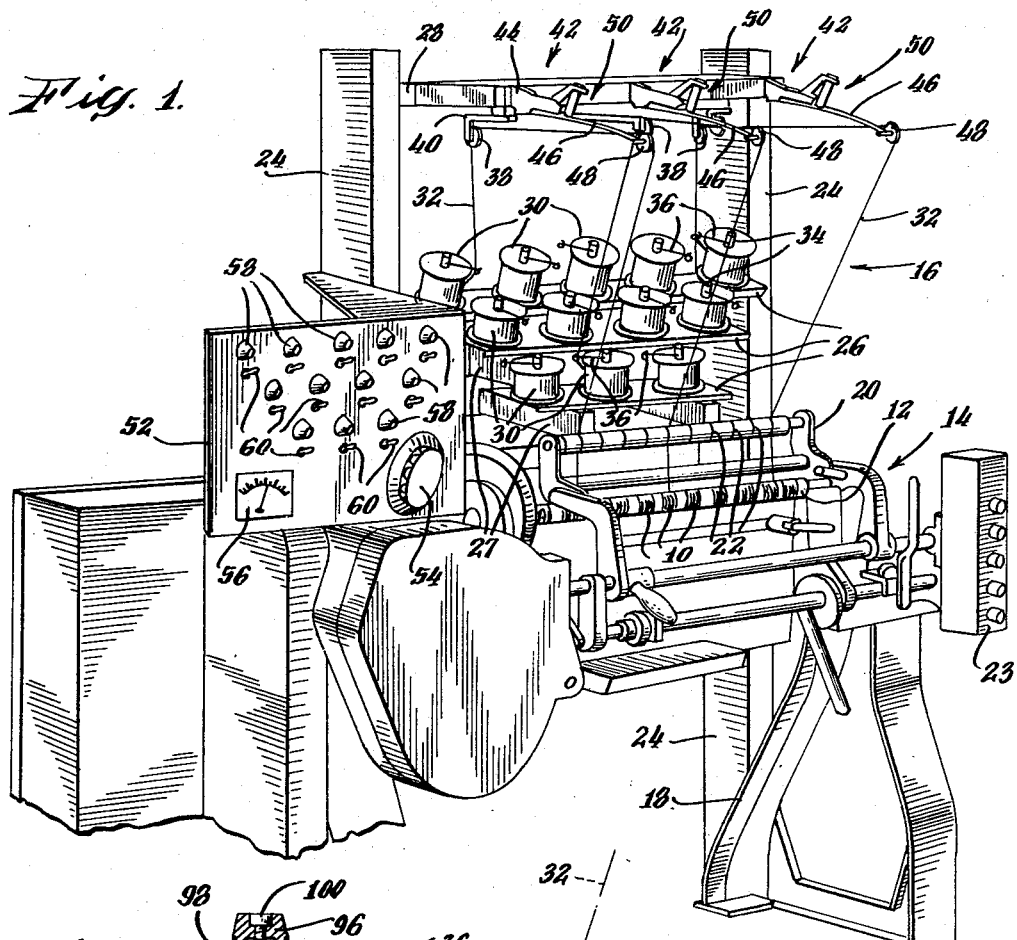
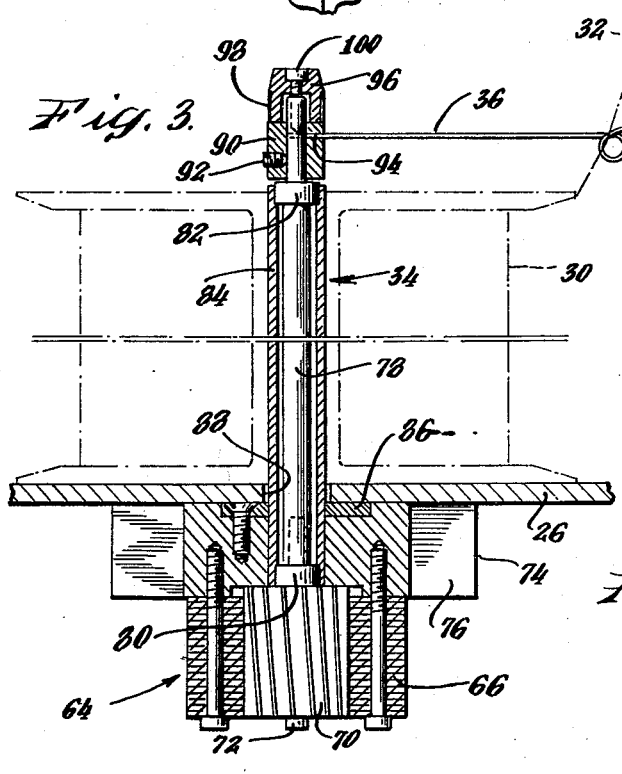
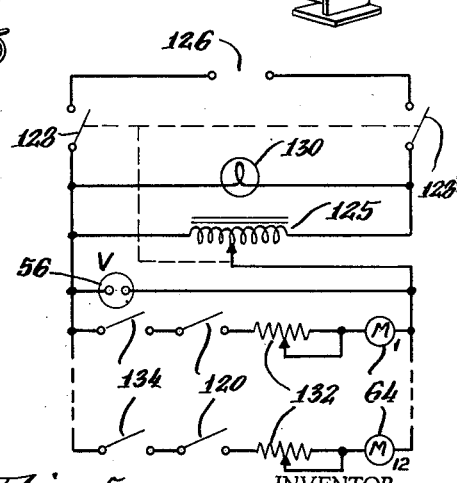
INVENTOR.
DONALD S. LEE
BY
ATTORNEYS.

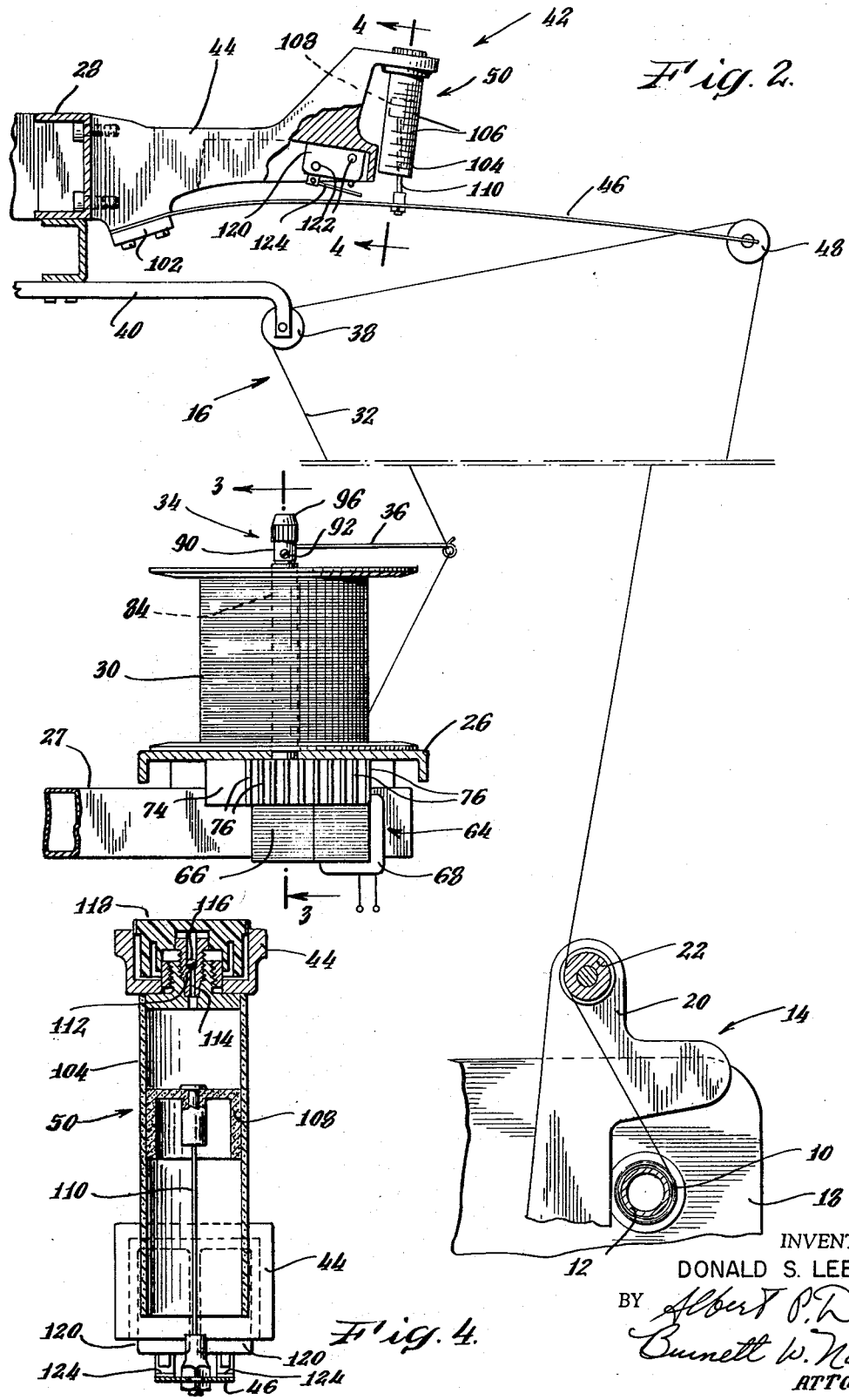

March 3, 1970　　　　D. S. LEE　　　　3,498,553
WIRE TENSIONING DEVICE
Filed March 15, 1968　　　　　　　　　　3 Sheets-Sheet 3
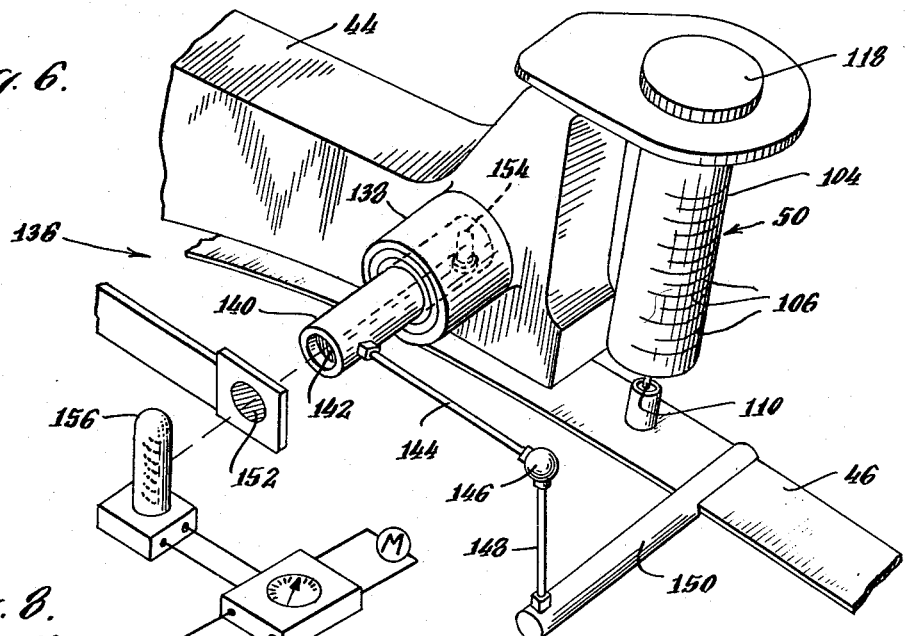
Fig. 6.
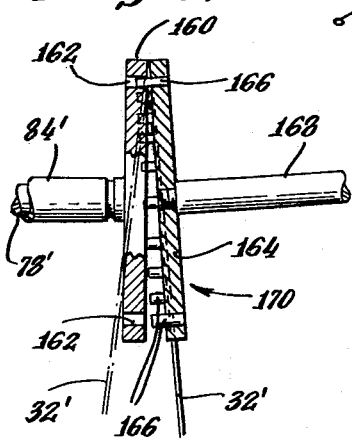
Fig. 8.
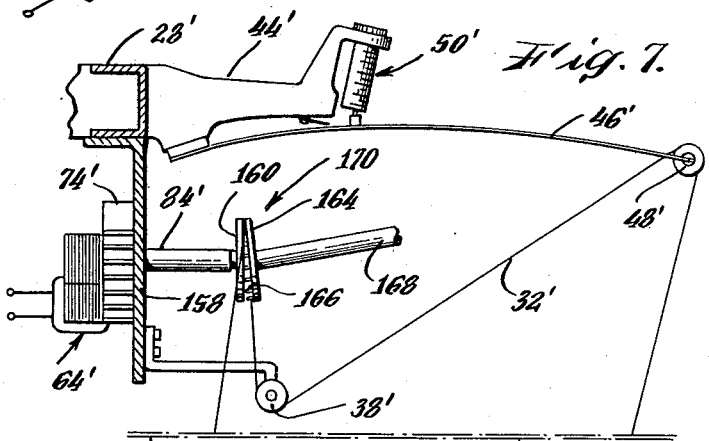
Fig. 7.
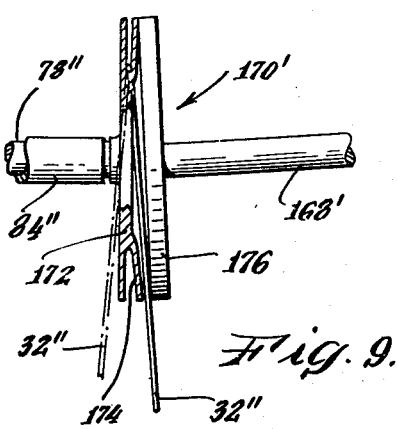
Fig. 9.
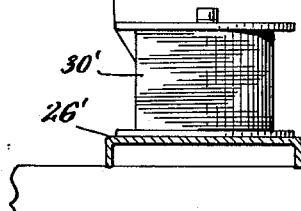
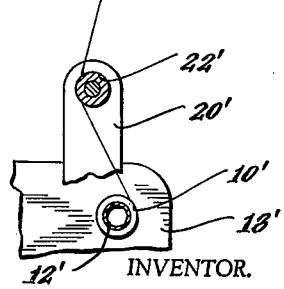
INVENTOR.
DONALD S. LEE
BY Albert P. Davis
Burnett W. Horton
ATTORNEYS.

3,498,553
Patented Mar. 3, 1970

3,498,553
WIRE TENSIONING DEVICE
Donald S. Lee, Brookfield, Conn., assignor to Leesona Corporation, Warwick, R.I., a corporation of Massachusetts
Filed Mar. 15, 1968, Ser. No. 713,336
Int. Cl. B65h 59/02
U.S. Cl. 242—45                                    28 Claims

ABSTRACT OF THE DISCLOSURE

A wire tensioning device for maintaining a constant substantially uniform tension on a wire which is being pulled from a supply spool including an electrical motor mounted upon a supporting member and having a rotatable pay-off member mounted thereon. The pay-off member engages wire leaving the supply spool and is rotated by the wire imparting a drag force to the wire proportional to the stall torque of the motor. An adjustable control device is connected to the electric motor for selectively changing the coil excitation and wire tension while the wire is in motion.

Background of the invention

This invention relates to a wire tensioning device for use in a wire winding apparatus and, more particularly, to such a device which will accurately maintain a predetermined uniform tension and a slack free condition in a wire being fed at a high rate of speed.

In the winding of continuous filaments, such as extremely fine wires used in the manufacture of ignition coils, it is necessary to maintain a uniform tension on the wire to insure a reliable product. Variations in tension during winding result in uneven spacing of the windings, loose windings, crossed windings, and if the tension suddenly becomes very great the wire may be locally stretched. These uneven conditions will result in rejected coils or coils whose operating performance is poor. Furthermore, sudden, large increases in tension will often cause the wire to rupture, resulting in "down-time" of the entire multiple coil winding machine. Extreme problems arise when winding variables are great such as where the coil form is not round but is square or rectangular so that the wire is pulled more rapidly by the corners of the coil than by the flats. Therefore, although the amount of uniform tension which may be applied to a wire without its breaking dependent upon the diameter of the wire and its strength, it is important that the force be maintained nearly constant as it is the sudden variations in tension which greatly affect coil characteristics.

Known coil winding machines include some type of wire tensioning apparatus to maintain a constant tension on the rapidly moving wire. Generally this apparatus is in the form of a mechanical linkage arrangement including a friction brake connected to the rotating wire pay-off means to control the speed of rotation of the pay-off means. The friction brake is controlled by a compensating apparatus generally in the form of a mechanical linkage connected to the friction brake, to increase or decrease the braking force in response to fluctuations in wire tension. The known apparatus applies tension to the wire between the pay-off means and the rapidly rotating built-up core by applying a drag to the wire to resist pay-off. When the pay-off means is remote from the supply spool this apparatus further requires a pre-tensioning device adjacent the supply spool to prevent ballooning of the wire off the supply spool caused by lack of tension between the pay-off means and the supply spool.

A major disadvantage of the various types of tension apparatus known to the prior art is the lack of precise control of tension due to the slow response of the mechanical compensating linkages. Another problem often encountered with the prior art devices is the difficulty in adjusting the device to change the wire tension.

Summary of the invention

Accordingly, it is the primary object of this invention to provide a simple and inexpensive device which will deliver extremely fine wire to a coil winding mechanism under a substantially uniform tension and will rapidly respond to accommodate winding variables. Another object is to provide a wire tensioning device having an infinite slack removal capability enabling the wire to be rewound from the coil to the supply spool if desired.

A further object of this invention is to provide a wire tensioning device which may be easily adjusted while the coil winding machine is in operation and which may be controlled from a remote location.

A still further object of this invention is to provide a wire tensioning device in which the actual running tension is continuously indicated to the operator.

A still further object of this invention is to provide a wire tensioning device including photoelectric compensating means capable of controlling wire tension in response to long range tension changes.

Several of the objects of my invention are achieved, in one form, by providing a wire tensioning device comprising: a support; rotatable pay-off means mounted upon the support and engaging wire leaving a supply spool; an electric motor secured to the support and including a rotor shaft secured in driving relation to the pay-off means and arranged to be rotated counter to its normal direction of rotation by the pay-off means as wire leaves the supply spool to impart a drag force to the wire; and electrical control means connected to the electric motor for selectively changing the value of wire tension while the wire is in motion.

Brief description of the drawings

Other objects and further details of that which I believe to be novel and my invention will become clear from the following description and claims taken with the accompanying drawings wherein:

FIG. 1 is a perspective view of a multiple coil winding machine incorporating the wire tensioning device of my invention;

FIG. 2 is a side elevational view of a single station of the coil winding machine of FIG. 1;

FIG. 3 is a sectional view taken substantially along line 3—3 of FIG. 2 showing the tensioning motor and pay-off means;

FIG. 4 is a sectional view taken substantially along line 4—4 of FIG. 2 showing the visual monitor;

FIG. 5 is a schematic wiring diagram of the control circuit of my tensioning device;

FIG. 6 is a schematic perspective view of a photoelectric compensating device;

FIG. 7 is a side elevational view of the tensioning device of my invention being used with a pay-off capstan;

FIG. 8 is a partial sectional view of the unique gripping capstan of my invention; and FIG. 9 is a partial sectional view of an alternative form of a gripping capstan.

Description of the preferred embodiments

With reference to the drawings, there is illustrated in FIG. 1, a multiple coil winding machine capable of simultaneously winding twelve spaced coils 10 upon a rotatable elongated spindle 12. The machine comprises a winding portion generally designated by the numeral 14 and a wire feed portion designated by the numeral 16 which may be selectively associated with one another for optimum coil winding efficiency. As the winding portion 14 is known to the prior art it will not be discussed at length. This portion includes a supporting frame 18, rotary driving means for the spindle 12 and an overhead traversing member 20 carrying grooved guide rollers 22 which is reversably driven in translation relative to the spindle 12. A suitable control panel 23 is located at the front of the machine for easy access by an operator.

Located directly behind the known winding portion 14 and easily accessible by an operator is the wire feed portion 16 having two upright support members 24 which carry spool shelves 26 therebetween at approximately their mid points upon supporting members 27 and carry a cross bar 28 therebetween at their upper ends. Supply spools 30 upon which wires 32 are wound are mounted for easy accessibility upon spindles 34 which form part of the tensioning device of my invention and will be described in more detail hereinafter. The wires 32 are payed-off the spools 30 by flyer arms 36 which lead the wires to overhead guide rollers 38 carried at the ends of brackets 40 extending from the cross bar 28.

Between each of the overhead guide rollers 38 and each of the traversing guide rollers 22, the wires 32 pass an adapter mechanism referred to generally by the numeral 42. The purpose of this mechanism is two-fold: first it allows the wires 32 to respond to minute variations in pay-off speed as determined by the winding characteristics of the wound coils 10; and second it enables the operator to have a visual indication of the wire tension at all times. Each mechanism 42 comprises an adapter bracket 44 secured to the crossbar 28 and extending forward therefrom, a low rate leaf spring 46 cantilever mounted upon the underside of the bracket 44 carrying a dancer pulley 48 at its end, and a visual read-out monitor 50 supported between the end of bracket 44 and approximately the midpoint of leaf spring 46.

At the left hand side of the winding portion 14 there is located a tension control console 52 having a master tension adjustment control 54, a voltmeter 56 and plural pairs of individual trimming controls 58 and ON-OFF switches 60. It should now be apparent that the tensioning device which will now be described is of extremely simple and inexpensive construction as it eliminates the complicated mechanical linkages necessitated by the prior art devices.

Since the winding operation is identical at each of the several winding stations, the operation of my unique tensioning device will be described with reference to a single station as illustrated in FIG. 2. It should be further understood that the principle of my tensioning device may be utilized in the multiple coil winding apparatus as illustrated in FIG. 1 as well as on a single coil or spool winding apparatus.

Turning now to FIGS. 2 and 3 there is illustrated a shelf 26 mounted upon the supporting member 27 which, in turn, is secured to the upright members 24. The supply spool 30 carrying the wire 32 is seated upon the shelf over the spindle 34. An electric motor 64 is secured to the underside of the shelf 26.

The tension motor 64, which may be either A.C. or D.C., is of subfractional size and is capable of operating at continuous stall without injury to the motor and, further, may be rotated counter to its normal direction of rotation at a high speed. For purposes of the present description motor 64 is a two-pole induction motor. The motor 64 is also of a type in which the stall torque is proportional to its coil excitation. By tailoring the parameters of the motor, I have been able to control the stall torque so that it remains substantially constant for usable counter-rotational speeds. For example, the following are some of the motor parameters controlled to obtain satisfactory operating characteristics: the number of coil windings; the number of stator laminations; the rotor end plate material; the size and number of shading coils and the diameter of the rotor relative to the rest of the motor. These parameters are dependent upon the particular application but are readily determinable by one skilled in the art. The motor 64 (note FIG. 3) includes a plurality of laminations making up the stator 66, a coil 68 (FIG. 2) mounted upon the stator and connected to a suitable source of alternating current and rotor 70 having a stub shaft 72.

In order to aid in dissipating the heat in the motor I have mounted a heat sink 74 contiguous therewith. The heat sink includes radially outwardly extending peripheral fins 76. Secured to the rotor stub shaft 72 is an elongated shaft 78 having seats at its ends to support suitable anti-friction bearings 80 and 82 thereupon. Encircling the elongated shaft 78 is a tubular shaft housing 84 fixedly secured to the heat sink 74 by means of a circumferential flange 86 and also supporting the bearings 80 and 82. Thus, the elongated shaft 78 may rotate freely within its housing 84. The shaft housing 84 passes through an opening 88 in the shelf 26 and through the central opening of the supply spool 30. A flyer securing collar 90 encircles the necked down end of shaft 78 and is retained thereon by means of suitable set screws 92. The collar 90 further includes a radial passage 94 therethrough in radial alignment with an opening in the end of the shaft 78. The flyer 36 may be inserted into the passage 94 and into the shaft opening and is held in place by means of a clamp knob 96 having an easily manipulable knurled circumference 98 and an axial securing screw 100. The screw 100 may be threadedly engaged in the end of the shaft 98 to clamp the end of the flyer 36 and hold it in place. The flyer comprises an elongated wire form having a loop at one end through which the wire 32 may pass.

The wire passes from the spool 30 to the guide roller 38 mounted on the bracket 40 and to the dancer pulley 48 of the adapter mechanism. Referring to the adapter mechanism 42 in greater detail, there is illustrated in FIG. 2 a low rate leaf spring 46 made of spring metal mounted upon the underside of the bracket 44 by a clamping plate 102. I have provided a low rate spring to insure that it will react rapidly to winding variations and at the same time will not exert too great an upward force on the fine wire which would appreciably increase the tension thereon. The desired spring tension may be controlled by selecting a leaf of the appropriate width and thickness and taking advantage of the adjustments built into the spring mounting. For example, the fixed end may be shimmed downwardly and the dancer pulley 48 may be repositioned at various locations near the end of the spring. The visual readout monitor 50 comprises a damping dashpot including a transparent cylinder 104, having graduations 106 thereon, secured to the bracket 44 at its upper end as clearly shown in FIG. 4 and a close fitting, sliding piston 108 having a piston rod 110 secured thereto. The lower end of piston rod 110 is secured to the leaf spring with a ball joint connection. Located at the upper end of the cylinder 104 is a plug 112 having a central axial bore 114 with a ball bearing check valve 116 seated therein. A plastic cap 118 may be snapped over the end of the plug 112 to insure that the ball bearing 116 remains in place yet allows air to flow from the interior of the cylinder through the valve to the atmosphere. Thus, it should be apparent that the piston 108 may move freely in an upward direction for rapid actuation of safety devices but that its downward movement is impeded to provide the desired damping action. A safety device in the form of two tandem limit switches 120 are secured in a cavity in the bracket 44 by means of suitable securing pins 122. Each limit switch is provided with a spring tripping arm 124 which will close the switches when the leaf spring 46 returns to its extreme upward position, as when the wire breaks.

In operation, the winding mechanism and the tension motors 64 are energized and the driving means will rotate the spindle 12 to wind the wire 32 thereon. Pulling of the wire causes the pay-off flyer 36 to drive the rotor 70 counter to its normal direction of rotation.

The payed-out wire passes over the guide roller 38 around the dancer pulley 48 and to the rotating spindle 12. Oscillation of the dancer pulley is responsive to the winding variables, thus providing an extremely rapid response to any slight slack or increased tension condition. Any substantial slack in the wire would, of course, be taken up by the flyer which has a tendency to rotate counter to the pay-off direction, thus providing the system with an infinite slack removal capability. Oscillations of the leaf spring 46 are translated to a visual tension reading by means of the visual readout monitor 50 which damps the constant minor fluctuations, recording the actual running tension in the wire. The piston 108 has a suitable marking thereon which may be observed through the wall of the cylinder 104 and may be compared with the graduations 106 to indicate the actual value of tension on the wire 32. This is a highly desirable feature in a coil winding apparatus where it is necessary to accurately control the tension in the wire to obtain proper coil characteristics.

As the motor has been constructed to have a constant stall torque for all usable speeds of counter-rotation for a given level of coil excitation, tension in the wire 32 will always be proportional to the stall torque. It should be apparent that the only control required to vary the tension may be in the form of a variable autotransformer 125 (note FIG. 5) connected to the motor coil 68 or may comprise a solid state voltage control circuit such as used in a household dimmer. These controls would enable the voltage in the coil 68 to be changed by the turning of dial 54 even when the machine is in operation. A typical control circuit has been schematically illustrated in FIG. 5. The variable autotransformer 125 is connected across a suitable power supply 126, a double pole-single throw switch 128 is mechanically coupled with the dial 54 of the variable autotransformer and a pilot light 130 is connected across the power supply line in parallel with the variable autotransformer 125. A voltmeter 56 is connected across the secondary of the variable autotransformer. Each tension motor 64 is connected in parallel with the voltmeter and will therefore be controlled by the variable autotransformer 125. In addition, I have provided each motor with an individual trimming control device 132 in the form of a variable resistor connected in series with the motor and controllable by means of the control knob 58. The individual normal ON-OFF switches indicated at 134 are controlled by the toggles 60 on the console and one of each pair of wire break limit switches 120 is connected in series with its respective tension motor 64. The other wire break limit switch of each pair (not shown on the schematic drawing) is suitably connected to stop the driving motor of the winding portion of the machine.

In the event of wire breakage, the dancer pulley 48 will spring up to its highest vertical position allowing the leaf spring 46 to contact the tripping arms 124 of limit switches 120 thereby shutting off the coil winding mechanism as well as deenergizing the tension motor 64 controlling the broken wire. Due to mechanical lag in the switch operation, the motor 64 will begin rotating in its forward direction counter to the pay-off direction and will coast to a stop causing the broken wire to be immediately and automatically rewound upon the supply spool 30. This is another highly desirable feature of my invention because it will return the wire to a known position. Furthermore, when a wire does break, it is possible to rewind the wire from the nondamaged coils back on to their respective supply spools by merely energizing the tension motors and driving the coil spindle in reverse. This facilitates coil salvage and repair operations.

When winding a single spool upon a machine especially designed therefor, much higher winding speeds may be attained, thus creating certain problems when the rotor rotation is in excess of 300 r.p.m. because the torque curve is no longer flat. I have also found that the torque curve departs from a constant value straight line when the parameters of the motor have not been precisely tailored to this end. Therefore, in order to maintain constant wire tension at all times, I have provided unique compensating means which may be added to my tension device whereby the amount of tension produced by the tension motor is controlled by and will be a function of the leaf spring deflection. It should be apparent that, as the leaf spring deflection increases indicating an increase in tension, it would be desirable to reduce the tension by changing the voltage excitation in the motor coil 68. This may be simply and inexpensively accomplished in a satisfactory manner by the use of a photoelectric device 136 coupled with the adapter mechanism 42 as illustrated in FIG. 6.

The compensating structure comprises in one form, a non-friction bearing 138 whose outer ring is fixedly mounted upon a suitable bracket and whose inner ring is freely rotatable. A thin-walled tubular member 140 is firmly secured in the inner ring and supports a polarized window 142 therein. A first lever arm 144 extends radially outwardly of the tubular member and may be secured by a suitable ball joint coupling 146 to a second lever arm 148 which in turn is secured to an arm 150 mounted upon the leaf spring 46 adjacent the airpot mounting. A fixedly mounted polarized window 152 may be mounted in axial alignment with the rotatable polarized window 142. Also in axial alignment with both windows is a suitable light source 154 located on one side of the window pair and a photocell 156 located on the other side thereof. As wire tension varies the vertical location of the leaf spring, the movable polarized window 142 will be rotated relative to the fixed polarized window 152, thus changing the amount of light incident upon the photocell 156. The photocell 156 is connected through suitable circuitry to a variable voltage control device and thereby adjusts the coil excitation to vary the motor stall torque and the wire tension. It should be noted that this type of compensating device is conceptually different from the known prior art compensating devices. Whereas the prior art devices are mechanical and are constantly making adjustments to vary the wire tension in response to winding variables, the photoelectric device 136 can act to disregard minor fluctuations of the dancer pulley 48 and responds merely to long range tension variations as indicated by the dashpot piston deflection.

It is often desired to pay-off the wire from the supply spool by means of a capstan drive rather than with a flyer arm as described above. I have found that my invention is equally adaptable to such a pay-off means and I shall briefly describe such means with particular reference to the modifications illustrated in FIGS. 7-9 wherein elements similar to those of the preferred embodiment described above are given similar numerals with a prime (') added.

A supply spool 30' is mounted upon a shelf 26' seated upon a suitable support platform. Positioned over the supply spool is a tension motor 64' secured to a heat sink 74' which is mounted on a vertical supporting structure 158. A rotatable shaft 78' sheathed in a tubular shaft housing 84' extends horizontally through the supporting structure carrying at its end a disc 160 having spaced circumferential holes 162. A second disc 164 having spaced axially extending pins 166 is mounted for rotation upon a shaft 168 which extends at a slight angle to the axis of shaft 78'. The wire 32' passes from the spool 30' over the capstan 170 defined by the two discs 160 and 164, to a guide roller 38', over a dancer pulley 48' mounted upon a leaf spring 46′ and to a winding station including a rotatable spindle 12′ and traversing guide roller 22′.

It should be understood that in the prior art devices it was necessary to incorporate pre-tensioning means between the capstan and the supply spool to control the tension of the wire from the supply spool. When winding very fine wires this pre-tension comprises a large part of the total tension and results in poor tension control. With the capstan of my invention pre-tensioning is not necessary since the capstan grips the wire. As shown and described with reference to the preferred embodiment wherein a flyer is used, the tensioning device not only applies a drag (tension) to the wire to resist pay-off but simultaneously also includes a positive force pulling the wire in opposition to the direction of winding. As the wire is payed-off, the capstan 170 is rotated and the wire 32′, lying on a root formed by the pins 156, is positively frictionally engaged by a small portion of the discs. As pointed out above, a force is applied to both ends of the wire including a drag (tension) on the winding end and a pre-tension on the supply end.

In FIG. 9 there is illustrated a alternative type of capstan 170′ including a flexible disc 172 having a V-groove 174 defined between resilient, flexible walls and a pressure disc 176. The discs 172 and 176 are mounted on axes which intersect at a slight angle. The wire 32″ is fed to the V-groove and as the discs rotate, the pressure disc 176 compresses the flexible disc 172 in the area of friction control to grasp the wire and to afford a positive feed.

Having described my invention of a wire tensioning device, it will be readily appreciated by those skilled in this art that a tensioning device embodying my invention is extremely simple in design, low in cost and ingenious in operation. Reliability of operation was of primary concern although ease of assembly and minimum cost of manufacture were also important considerations leading to my invention.

It should be understood that the present disclosure has been made only by way of example and that numerous changes in details of construction and the combination and arrangement of parts may be resorted to without departing from the true spirit and the scope of the invention as hereinafter claimed.

What is claimed is:

1. A tensioning device for maintaining constant substantially uniform tension on a strand being pulled from a supply spool comprising, electric drive means having an elongated shaft connected therewith for rotation thereby, said elongated shaft passing through said supply spool, a flyer arm radially mounted on said elongated shaft and carrying the strand at its free end; the strand as it leaves the supply spool serving to move said flyer arm and said elongated shaft in a direction counter to the normal direction of rotation imparted thereto by said drive means to thereby impart a tensioning force to the strand.

2. A tensioning device as defined in claim 1 including electrical control means for selectively changing the value of the tensioning force on the strand leaving said supply spool.

3. The tensioning device defined in claim 2 wherein: said electric drive means is an electric motor including a stator and a stator coil; and said electrical control means includes means for varying the coil excitation.

4. The tensioning device defined in claim 1 wherein said electric drive means includes a stator and a stator coil, and said electric drive means is capable of being operated indefinitely under stall conditions and generates a substantially constant torque in response to counterrotation of said rotating member.

5. The tensioning device defined in claim 2 wherein tension compensating means are provided to adjust said electrical control means in response to long range changes in tension.

6. The tensioning device defined in claim 5 wherein said tension compensating means includes a photoelectric feed back device.

7. The tensioning device defined in claim 6 wherein said photoelectric feedback device comprises: a fixed light source; a fixed photocell spaced from said light source; a first polarized sheet located between said light source and said photocell; and a second polarized sheet mounted for relative rotation in a plane parallel to said first sheet and also located between said light source and said photocell, rotation of said second sheet relative to said first sheet serving to reduce the intensity of the light source on substantially the entire surface of the photocell.

8. The tensioning device defined in claim 1 wherein a resilient arm is fixedly mounted upon a support means, and a dancer pulley is carried at the free end of said resilient arm over which the strand passes as it leaves said supply spool and is located so that said resilient arm increases its deflection as strand tension increases.

9. The tension device defined in claim 8 including a tension readout monitor for indicating the value of strand tension.

10. The tensioning device defined in claim 9 wherein said tension readout monitor comprises an airpot including: a transparent cylinder having graduations thereon secured to said support means; a freely movable piston positioned in said cylinder having a piston rod secured to said resilient means; and a check valve for damping flutter in said resilient means, whereby said piston will be visible through said cylinder and its position relative to said graduations will be an indication of the tension of the strand.

11. A multiple coil winding machine having plural wire supply spools, comprising: a plurality of wire tensioning devices, each said device including rotatable means engaging the wire leaving an associated supply spool, electric motor means in driving relationship with said rotatable means and arranged to rotate counter to its normal direction of rotation by said rotatable means as the wire leaves the supply spool to impart a drag to the wire; master electrical control means for simultaneously selectively adjusting all said electric motor means to vary the tension in each wire; and individual trim control means for selectively adjusting a single given electric motor to vary the tension on a single wire, whereby the wire tension may be varied by both said master and individual control means while the winding machine is in operation.

12. A multiple coil winding machine having plural wire supply spools, comprising: a plurality of wire tensioning devices, each said device including rotatable means engaging the wire leaving an associated supply spool, electric motor means in driving relationship with said rotatable means and arranged to rotate counter to its normal direction of rotation by said rotatable means as the wire leaves the supply spool to impart a drag to the wire, electric control means connected to said motor for selectively changing the value of wire tension while the motor is in motion, tension compensating means to adjust said electric control means in response to long range changes in wire tension; master electrical cotrol means for simultaneously selectively adjusting all said electric motors to vary the tension in each wire; individual trim control means for selectively adjusting a single given electric motor to vary the tension in a single wire; and safety means positioned upon said support member adjacent each of said resilient arms and actuable by said one of said resilient arms in response to breakage of a single wire for opening the single electric motor circuit and shutting off the multiple coil winding machine.

13. A strand tensioning device for maintaining a constant substantially uniform tension on a strand, comprising: a stationary supply spool on which said strand is wound, an electric motor having a strand engaging element connected therewith, said motor being rotated counter to its normal direction of rotation as said strand leaves said spool and advances on said strand engaging element to thus impart a tensioning force on the strand during its advancement, said motor including a stator, stator coil and rotor arranged to permit said motor to operate indefinitely under stall conditions and to generate constant torque in response to rotor counterrotation.

14. A strand tensioning device as defined in claim 13 wherein said strand engaging element includes a flyer connected with said rotor and arranged to guide said strand off said spool.

15. A strand tensioning device as defined in claim 13 wherein said strand engaging element includes a capstan connected with said rotor and arranged to guide said strand during its advance.

16. The strand tensioning device defined in claim 14 including electrical control means for varying excitation in said stator coil.

17. The strand tensioning device defined in claim 16 including tension compensating means for adjusting said electrical control means in response to long range changes in strand tension.

18. The strand tensioning device defined in claim 17 wherein said tension compensating means includes a photoelectric feedback device.

19. The strand tensioning device defined in claim 18 wherein said photoelectric feedback device comprises, a fixed light source, a fixed photocell spaced from said light source, a first polarized sheet located between said light source and said photocell, and a second polarized sheet mounted for relative rotation in a plane parallel to said first sheet and also located between said light source and said photocell, rotation of said second sheet relative to said first sheet acting to reduce the intensity of the light source incident on substantially the entire surface of the photocell.

20. The strand tensioning device as defined in claim 13 including a resilient arm supported at a fixed locus, and a dancer pulley carried on the free end of said resilient arm, the strand engaging said pulley during its advance and deflection of said resilient arm increasing as tension in said strand increases.

21. The strand tensioning device defined in claim 20 including a tension readout monitor which comprises an airpot including, a transparent cylinder having graduations thereon, a freely movable piston positioned in said cylinder having a piston rod secured to said resilient means, and a check valve for damping flutter in said resilient means, whereby said piston is visible through said cylinder and its position relative to said graduations is an indication of strand tension.

22. A tensioning device for maintaining constantly substantially uniform tension on a strand being pulled from a supply spool comprising, electric drive means having an elongated shaft connected therewith for rotation thereby, a first rotatable disc having a first axis of rotation and secured in driving engagement to said shaft, and a second disc having a second axis of rotation slightly angularly displaced from said first axis of rotation and located closely adjacent to said first disc, whereby as a strand is moved between said discs it is frictionally engaged in the area where the discs are closest and drives said discs in a direction counter to rotation of said drive means to impart a tensioning force on said strand.

23. A strand tensioning device as defined in claim 22 including electrical control means for selectively changing the value of the tensioning force on the strand leaving the supply spool.

24. The tensioning device defined in claim 23 wherein said electric drive means is an electric motor including a stator and a stator coil; and said electrical control means includes means for varying the coil excitation.

25. The tensioning device defined in claim 22 wherein said electric drive means includes a stator and a stator coil, and said electric drive means is capable of being operated indefinitely under stall conditions and generates a substantially constant torque in response to counterrotation of said rotating member.

26. The tensioning device defined in claim 24 wherein tension compensating means are provided to adjust said electrical control means in response to long range changes in tension.

27. The tensioning device defined in claim 26 wherein said tension compensating means includes a photoelectric feed back device.

28. The tensioning device defined in claim 22 wherein a resilient arm is fixedly mounted upon a support means, and a dancer pulley is carried at the free end of said resilient arm over which the strand passes as it leaves said supply spool and is located so that said resilient arm increases its deflection as strand tension increases.

References Cited

UNITED STATES PATENTS

| | | | |
|---|---|---|---|
| 1,981,133 | 11/1934 | Waters | 242—45 |
| 2,343,461 | 3/1944 | Knaus et al. | 242—45 |

FOREIGN PATENTS

| | | |
|---|---|---|
| 1,065,534 | 9/1959 | Germany. |

NATHAN L. MINTZ, Primary Examiner